(12) United States Patent
Luckow et al.

(10) Patent No.: US 6,386,618 B1
(45) Date of Patent: May 14, 2002

(54) SINGLE PARTING LINE BETWEEN SIDE DOOR AND BACK DOOR OF A VEHICLE

(75) Inventors: Dennis B. Luckow, Bloomfield, MI (US); Doug Wilson, San Diego, CA (US)

(73) Assignees: Nissan Technical Center North America, Inc., Farmington Hills, MI (US); Nissan Design America, Inc., San Diego, CA (US)

( * ) Notice: Subject to any disclaimer, the term of this patent is extended or adjusted under 35 U.S.C. 154(b) by 0 days.

(21) Appl. No.: 09/498,352

(22) Filed: Feb. 4, 2000

(51) Int. Cl.[7] .............................................. B62D 33/06
(52) U.S. Cl. ................. 296/146.9; 296/209; 296/146.8; 296/190.11; 296/183
(58) Field of Search ............................ 296/209, 29, 56, 296/146.5, 146.8, 146.9, 190.11, 190.08, 183, 106; D12/96

(56) References Cited

U.S. PATENT DOCUMENTS

| | | | | |
|---|---|---|---|---|
| 4,480,868 A | * | 11/1984 | Koto ...................... | 296/190.11 |
| 5,934,727 A | * | 8/1999 | Store et al. .............. | 296/26.11 |
| 5,964,496 A | * | 10/1999 | Nozaki et al. ............ | 296/146.9 |
| 6,070,932 A | * | 6/2000 | Lopez-Baquero et al. ......... | 296/146.9 |

FOREIGN PATENT DOCUMENTS

JP          63-11251          1/1988

OTHER PUBLICATIONS

Photographs, Figures 8–11, (4 Sheets) Mar. 1999.
International Automobile Manufacturers Update, vol. 10, No. 8, 4 pages, (Aug. 1999).

* cited by examiner

Primary Examiner—Stephen T. Gordon
Assistant Examiner—Jason Morrow
(74) Attorney, Agent, or Firm—Foley & Lardner

(57) ABSTRACT

A vehicle has a body; a side door, mounted on the body, at a side of the vehicle; and a back door, mounted on the body, at a back of the vehicle. The side door and the back door are mounted on the body such that a rear edge of the side door and an outboard edge of the back door are adjacent to each other when the side door and the back door are closed. The invention may also include a seal to seal a gap between the rear edge of the side door and the outboard edge of the back door. The invention may further include a back pillar outer panel recessed from an outer surface of the vehicle. The seal can be mounted on the back pillar outer panel to seal a gap between the rear edge of the side door and the outboard edge of the back door.

6 Claims, 6 Drawing Sheets

SINGLE PARTING LINE BETWEEN SIDE DOOR AND BACK DOOR OF A VEHICLE

BACKGROUND

The invention is directed to an improved body structure arrangement between a side door and a back door of a vehicle. The invention is applicable to, for example, a sport utility vehicle, a sport utility truck, a minivan, a hatchback, and other types of vehicles.

FIGS. 1 and 2 show a prior art arrangement. FIG. 2 is a top cross-sectional view taken along plane II—II in FIG. 1.

FIGS. 1 and 2 show a vehicle 100 having a side door 110 and a back door 140. The side door 110 includes a side door inner panel 112, a side door outer panel 114, and side door glass 116. A back pillar 120 is formed from a back pillar outer panel 124 and a back pillar inner panel 122. The back door 140 includes a back door inner panel 142 and a back door outer panel 144, and also includes glass 146. Two seals 152 and 154, respectively, provide a seal between the doors 110 and 140 and back pillar 120. As viewed from outside the vehicle (with the doors shut) the back pillar outer panel 124 separates the side and back doors.

FIG. 3 is a perspective view of another arrangement of body structure for joining a side door and a back door. The FIG. 3 arrangement is for a sport utility truck. In FIG. 3, as viewed from outside the vehicle (with the side and back doors shut), a back pillar outer panel 224 separates a side door 210 and a back door 240. Such an arrangement is shown in *International Automobile Manufacturing Update*, Volume 10, Number 8, August 1999.

SUMMARY OF THE INVENTION

An object of the invention is to provide an improved arrangement between a side door and a back door of a vehicle.

The invention is a vehicle having a body; a side door, mounted on the body, at a side of the vehicle; and a back door, mounted on the body, at a back of the vehicle. The side door and the back door are mounted on the body such that a rear edge of the side door and an outboard edge of the back door are adjacent to each other when the side door and the back door are closed.

The invention may also include a seal to seal a gap between the rear edge of the side door and the outboard edge of the back door.

The invention may further include a back pillar outer panel recessed from an outer surface of the vehicle. The seal can be mounted on the back pillar outer panel to seal a gap between the rear edge of the side door and the outboard edge of the back door.

DETAILED DESCRIPTION OF PREFERRED EMBODIMENTS

Figure 1:
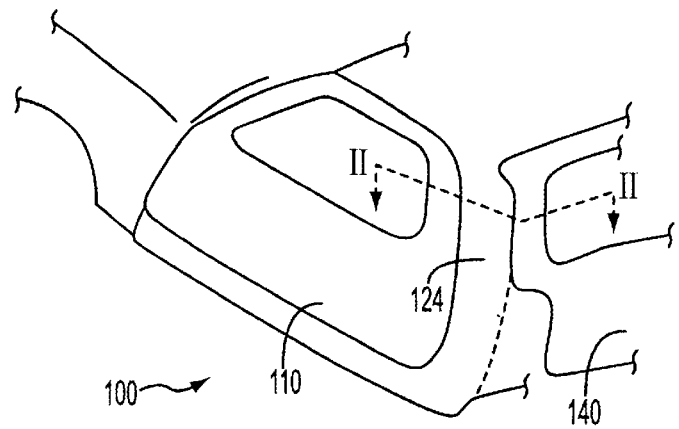
FIG. 1 shows a prior art arrangement.
Figure 2:
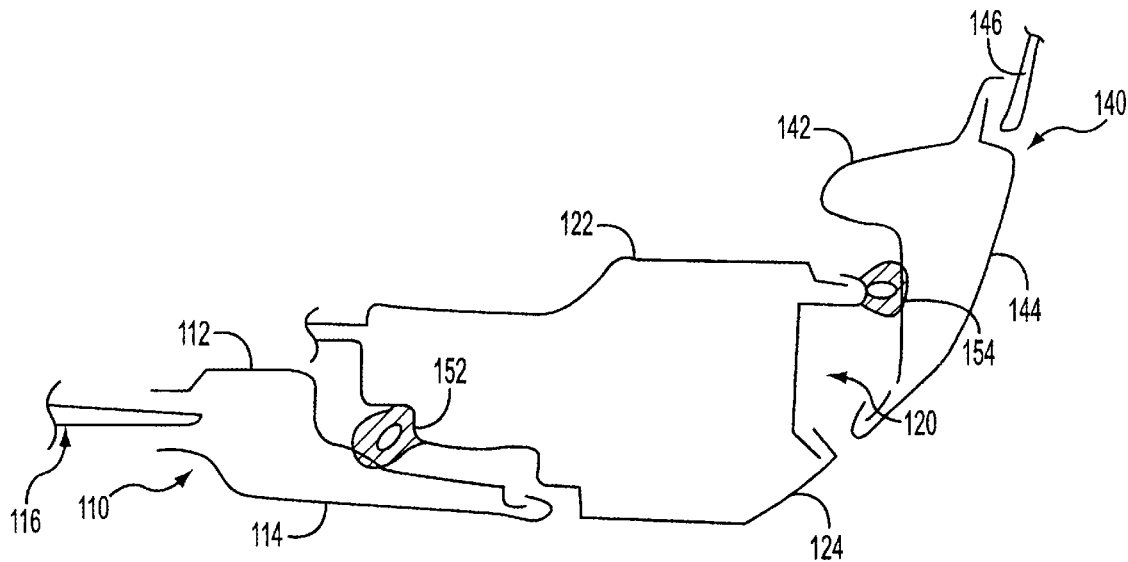
FIG. 2 shows a top cross-sectional view of the arrangement of FIG. 1.
Figure 3:
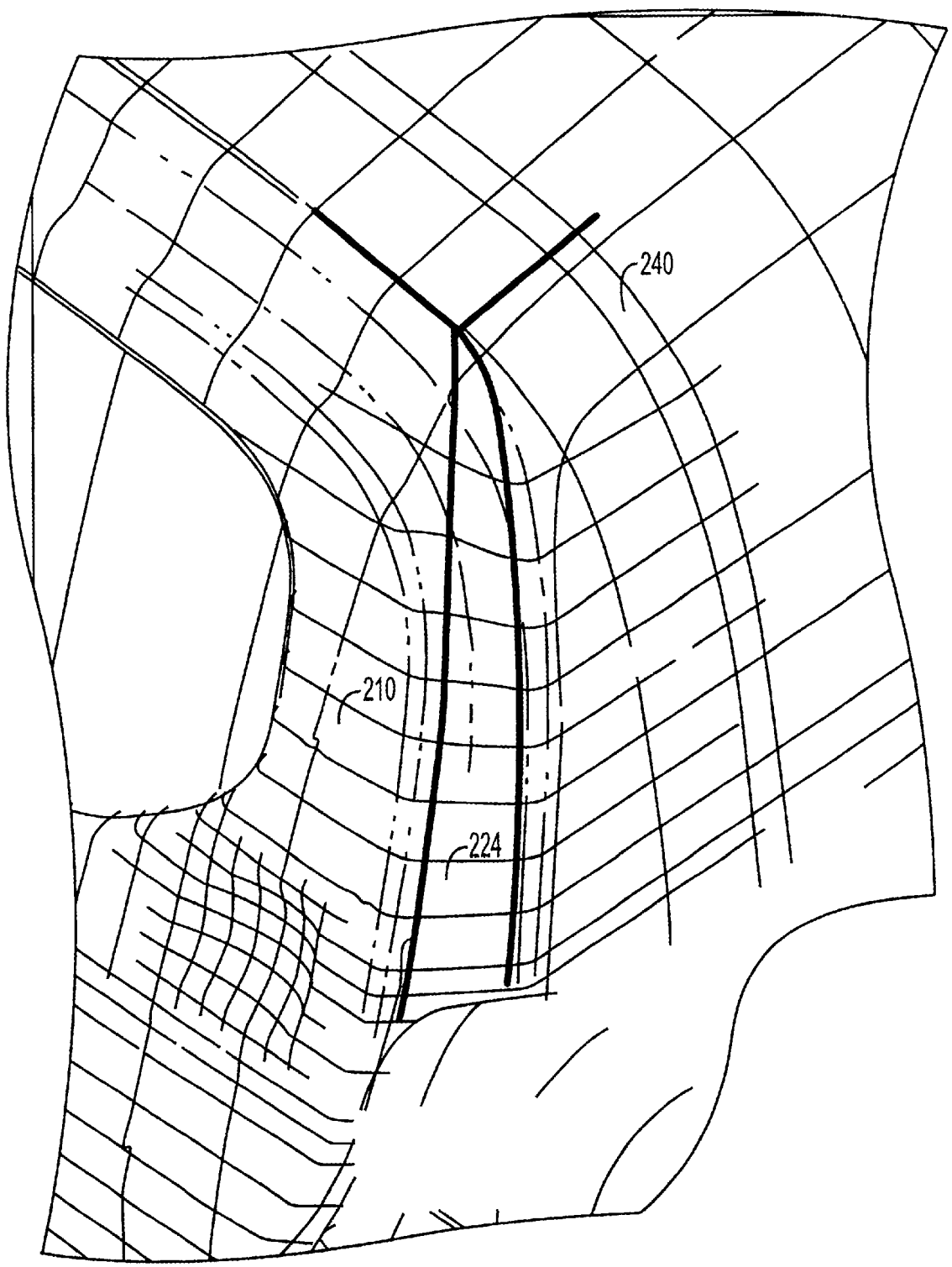
FIG. 3 is a perspective view of another arrangement for joining a side door and a back door.

The present invention overcomes certain disadvantages of prior art designs (such as shown in FIGS. 1 and 2). One problem with the prior art design is that, because the back pillar outer panel 124 is visible from outside the vehicle, it must be manufactured with a smooth (Class A) surface. Also, and perhaps more importantly, the size and geometry of the back pillar 120 reduces visibility (for example, when the driver is looking from inside the vehicle in the left-rear or right-rear directions).

Figure 4:
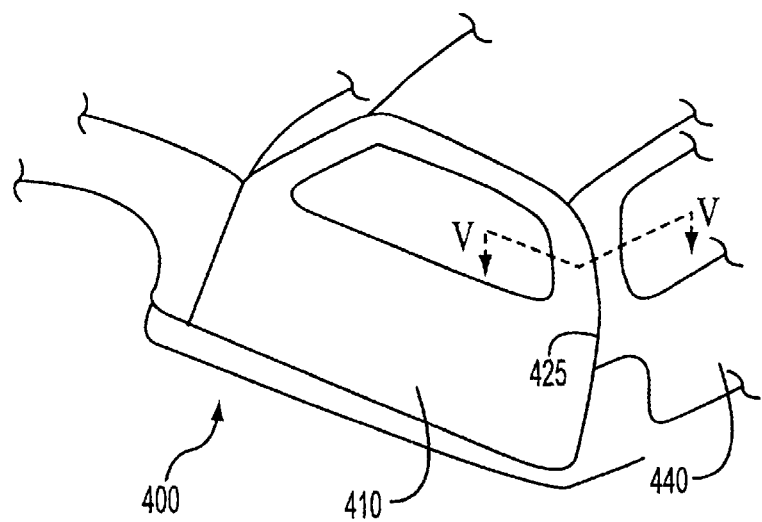
FIG. 4 shows an arrangement according to one embodiment of the invention.
Figure 5:
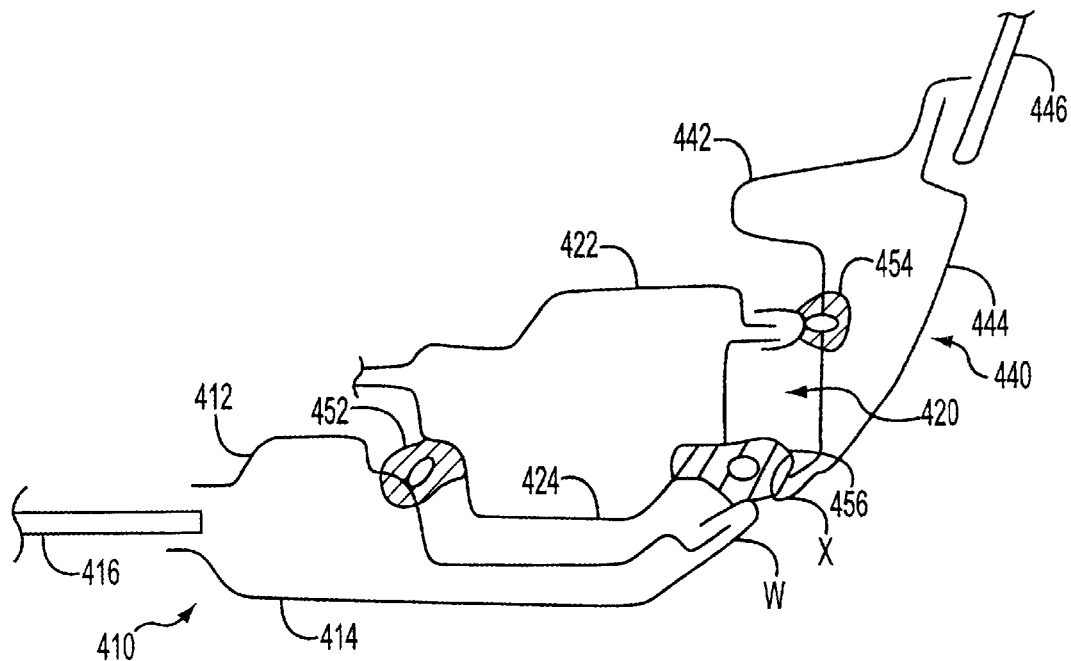
FIG. 5 shows a top cross-sectional view of the arrangement of FIG. 4.

FIGS. 4 and 5 show one embodiment of the present invention. FIG. 5 shows a top cross-sectional view taken along plane V—V in FIG. 4.

As shown in these Figures, a vehicle 400 has a side door 410 and a back door 440 mounted on the vehicle body. The term "side door" as used in this patent specification and in the claims includes, for example, a front side door (with hinges along a vertical line on the front end or rear end of the door), a rear side door (with hinges along a vertical line on the front end or rear end of the door), a sliding side door, or any type of door on the side of a vehicle. The term "back door" includes, for example, a door on the back of a minivan (with hinges on the top (along a horizontal line) or sides of the door), a door between the passenger compartment (or cab) and cargo bed of a SUT (with hinges on the top or sides of the door), the back door of a hatchback-type car, or any other door on the back of a vehicle.

As shown in the Figures, the side door 410 and back door 440 come together at a single parting line 425. In other words, the side door and the back door are mounted on the body such that a rear edge W of the side door and an outboard edge X of the back door are adjacent to each other when the side door and the back door are closed.

The side door 410 includes a side door inner panel 412, a side door outer panel 414, and side door glass 416. The back door 440 includes a back door inner panel 442, a back door outer panel 444, and glass 446. A back pillar 420 includes a back pillar inner panel 422, and a back pillar outer panel 424. The back pillar outer panel 424 is, in general, not visible when both doors are closed. In other words, the back pillar outer panel does not form part of the surface of the vehicle which is visible when both doors are shut.

Three seals are provided to seal the vehicle and reduce noise. One seal 452 is between the side door inner panel 412 and the back pillar outer panel 424. One seal 454 is between the back door inner panel 442 and the joint between the back pillar inner and outer panels. A third seal 456 is between the side door, the back door, and the back pillar outer panel. This seal 456 minimizes wind noise and also hides the back pillar outer panel 424 (which is not manufactured as a Class A surface). All of these seals are made from materials commonly used for seals (or weatherstrips).

The back pillar 420 in FIG. 5 is smaller in cross section than the pillar 120 in FIG. 2 (assuming that the basic dimensions of vehicle 100 and vehicle 400 are the same). Thus, the arrangement of FIG. 5 reduces the degree to which the back pillar obstructs the rear vision of the driver.

Figure 6:
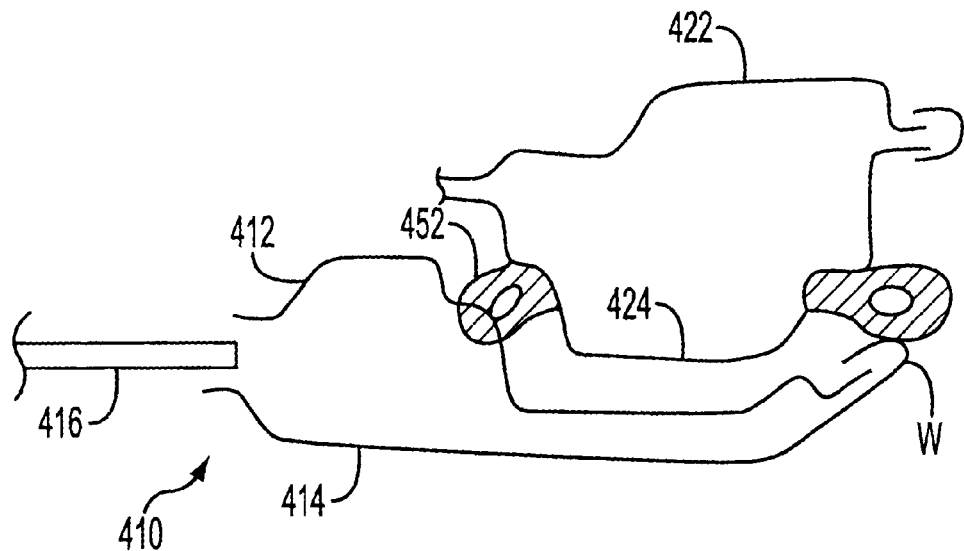
FIG. 6 shows the FIG. 5 arrangement with the back door open.
Figure 7:
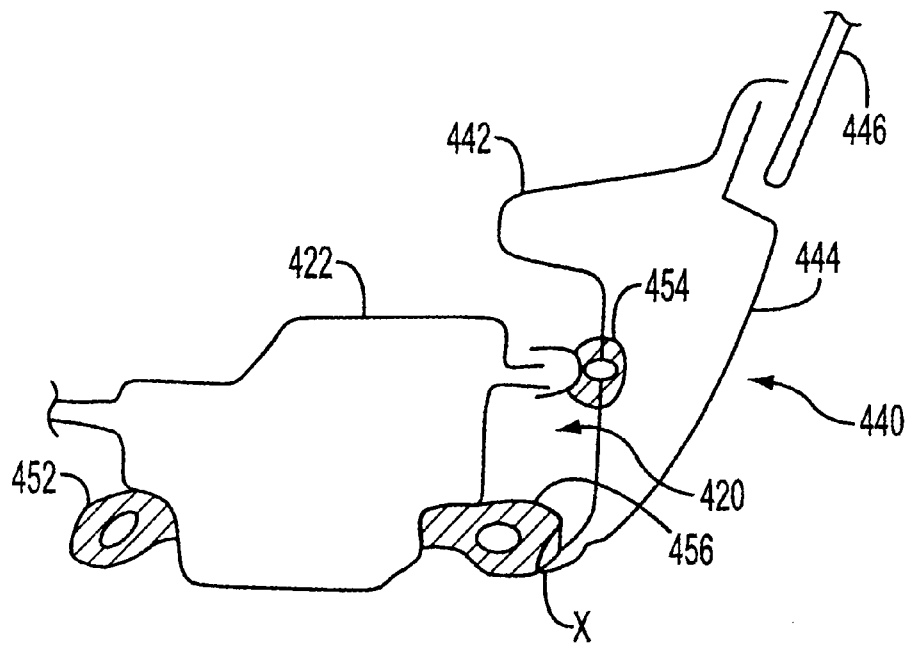
FIG. 7 shows the FIG. 5 arrangement with the side door open.

FIGS. 6 and 7 show that when either the back door is open (FIG. 6) or the side door is open (FIG. 7) edges W and X are not adjacent to each other.

Figure 8:
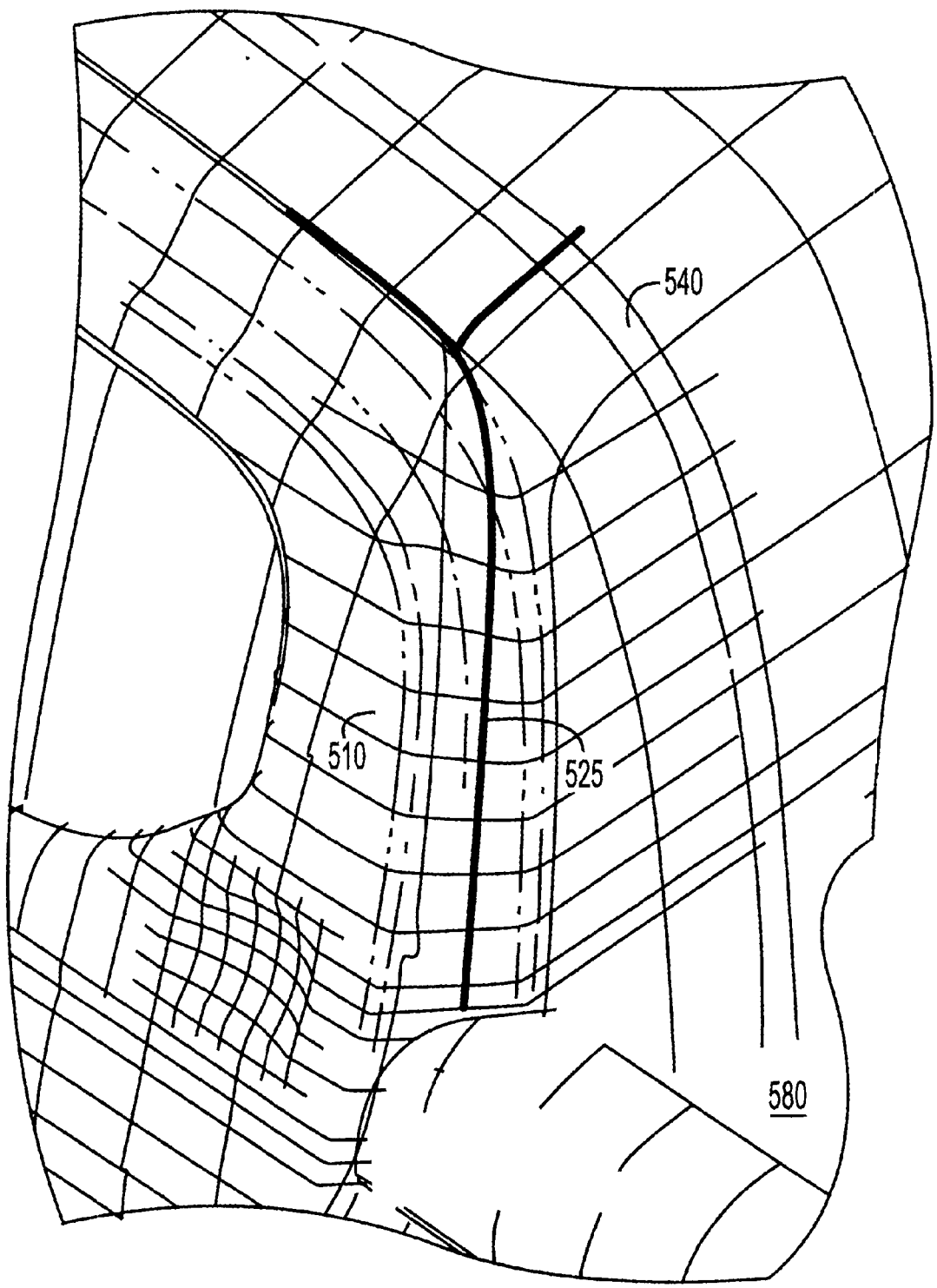
FIG. 8 is a perspective view of an arrangement similar to the FIG. 4 and FIG. 5 arrangements for a sport utility truck (SUT).

FIG. 8 is a perspective view showing the invention employed in a sport utility truck. As shown in FIG. 8, a single parting line 525 separates a side door 510 from a back door 540. The back pillar is not visible from outside the vehicle (when the doors are shut). In the FIG. 8 desing, the side door 510 is hinged (with hinges along a substantially vertical line) at the front end of the side door (not shown) and the back door is hinged (with hinges along a substantially horizontal line) at the top of the back door. The side door 510 is the side door of a cab of a SUT and the back door 540 is the back door between the cab and cargo bed 580 of a SUT.

Figure 9:
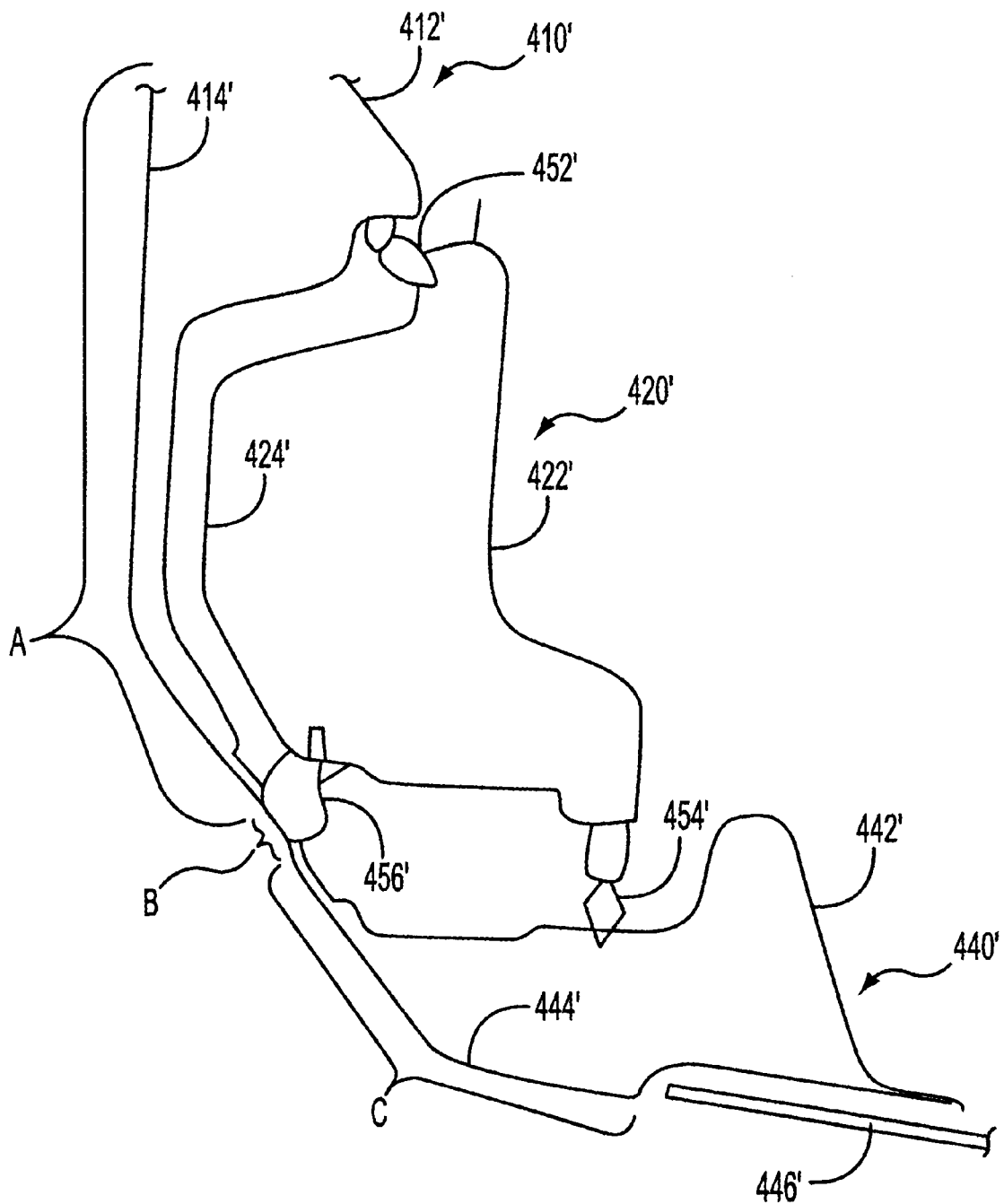
FIG. 9 shows another arrangement of the invention.

FIG. 9 shows another example similar to FIG. 5 but with a slightly different geometry. As shown, the outer surface of the vehicle is made up of the surface A of side door outer panel 414'; the surface B of seal 456', and the surface C of back door outer panel 444'. The back pillar outer panel 424' is recessed from (behind) the outer surface of the vehicle. FIG. 9 also illustrates a side door 410', a side door inner panel 412', a back pillar 420', a back pillar inner panel 422', a back door 440', a back door inner panel 442', glass 446', a seal 452', and a seal 454'.

Because the back pillar according to the present invention is smaller, visibility (rear vision) is improved. Also, it is easier to get objects in and out of the vehicle because the back pillar is relatively smaller and the door openings are relatively larger. The invention also has advantages from the viewpoint of styling and attractiveness.

The invention is not limited to the specific examples of the invention set forth above. Variations and modifications of the examples set forth above will occur to those in the field. Such variations and modifications are within the spirit and scope of the invention. Accordingly, the invention is defined with reference to the following claims.

We claim:

1. A vehicle comprising:

a body;

a side door, mounted on the body parallel to a longitudinal axis of the body, at a side of the vehicle; and a back door, mounted on the body perpendicular to said longitudinal axis of the body at a back of the vehicle by a hinge assembly located at substantially the same transverse vertical plane as the rear edge of the side door; and wherein the side door and the back door are mounted on the body such that the rear edge of the side door and an outboard edge of the back door are adjacent to each other when the side door and the back door are closed.

2. A vehicle as set forth in claim 1, further comprising:

a seal to seal a gap between the rear edge of the side door and the outboard edge of the back door.

3. A vehicle comprising:

a body;

a side door, mounted on the body parallel to a longitudinal axis of the body, at a side of the vehicle; and a back door, mounted on the body perpendicular to said longitudinal axis of the body, at a back of the vehicle; and wherein the side door and the back door are mounted on the body such that a rear edge of the side door and an outboard edge of the back door are adjacent to each other when the side door and the back door are closed;

and further comprising:

a back pillar outer panel recessed from an outer surface of the vehicle.

4. A vehicle comprising:

a body;

a side door, mounted on the body parallel to a longitudinal axis of the body, at a side of the vehicle; and a back door, mounted on the body perpendicular to said longitudinal axis of the body, at a back of the vehicle; and wherein the side door and the back door are mounted on the body such that a rear edge of the side door and an outboard edge of the back door are adjacent to each other when the side door and the back door are closed;

and further comprising:

a back pillar outer panel recessed from an outer surface of the vehicle; and a seal, mounted on the back pillar outer panel, to seal a gap between the rear edge of the side door and the outboard edge of the back door.

5. A vehicle comprising:

a body;

a side door, mounted on the body parallel to a longitudinal axis of the body, at a side of the vehicle;

a back door, mounted on the body perpendicular to said longitudinal axis of the body, at a back of the vehicle;

wherein the side door and the back door are mounted on the body such that a rear edge of the side door and an outboard edge of the back door are adjacent to each other when the side door and the back door are closed; and wherein the side door is a side door of a cab and the back door is a back door between the cab and a cargo bed.

6. A vehicle as set forth in claim 1, wherein the rear edge and the outboard edge are not adjacent to each other when one or both of the side door and the back door are open.

* * * * *